(12) United States Patent
Wei et al.

(10) Patent No.: US 10,638,135 B1
(45) Date of Patent: Apr. 28, 2020

(54) CONFIDENCE-BASED ENCODING

(71) Applicant: Amazon Technologies, Inc., Reno, NV (US)

(72) Inventors: Hai Wei, Seattle, WA (US); Charles Benjamin Franklin Waggoner, Portland, OR (US); Srinivas Rajagopalan, Seattle, WA (US); Srikanth Kiran Kotagiri, Redmond, WA (US); Lei Li, Kirkland, WA (US); Yang Yang, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 103 days.

(21) Appl. No.: 15/882,785

(22) Filed: Jan. 29, 2018

(51) Int. Cl.
| | |
|---|---|
| *H04N 19/142* | (2014.01) |
| *H04N 19/119* | (2014.01) |
| *H04N 19/167* | (2014.01) |
| *H04N 19/184* | (2014.01) |
| *H04N 19/103* | (2014.01) |

(52) U.S. Cl.
CPC ......... *H04N 19/142* (2014.11); *H04N 19/119* (2014.11); *H04N 19/167* (2014.11); *H04N 19/184* (2014.11); *H04N 19/103* (2014.11)

(58) Field of Classification Search
CPC .......................... H04N 19/142; H04N 19/119
See application file for complete search history.

(56) References Cited

U.S. PATENT DOCUMENTS

| | | | | |
|---|---|---|---|---|
| 6,332,042 B1 * | 12/2001 | Kondo | ............... | H04N 19/89 382/239 |
| 7,346,507 B1 * | 3/2008 | Natarajan | ............. | G10L 15/063 379/88.04 |
| 8,189,114 B2 * | 5/2012 | Petersohn | .......... | G06K 9/00765 348/135 |
| 8,385,663 B2 * | 2/2013 | Xu | ..................... | G06K 9/00765 382/225 |
| 9,578,277 B2 * | 2/2017 | Yu | ........................ | H04N 9/8042 |
| 10,003,768 B2 * | 6/2018 | Adsumilli | ............ | H04N 7/0137 |
| 10,303,984 B2 * | 5/2019 | Lee | ....................... | G06K 9/6276 |
| 10,417,501 B2 * | 9/2019 | Ashour | ................ | G06K 9/6262 |
| 2008/0165859 A1 * | 7/2008 | Sung | ..................... | H04N 19/61 375/240.24 |
| 2009/0041312 A1 * | 2/2009 | Wakasugi | .......... | G06K 9/00711 382/118 |
| 2013/0259390 A1 * | 10/2013 | Dunlop | ............. | G06K 9/00718 382/224 |

(Continued)

*Primary Examiner* — Irfan Habib
(74) *Attorney, Agent, or Firm* — Hogan Lovells US LLP

(57) ABSTRACT

The disclosure is related to allocation of bits in a media stream. In an example, a video stream is segmented into groups of pixels. A determination of a class type is made for individual ones of the groups of pixels. The determination can be based at least in part on semantic similarity of the class type and of a scene represented in the groups of pixels. A further determination occurs for sets of classified data associated with regions of interest (ROIs) according to the determined class type. Masking data associated with the sets of classified data is provided and confidence measures associated with the sets of classified data and the ROIs are determined. Bits are then allocated for groups of pixels based on the masking data and the confidence measures. Thereafter, a bit stream with the bits can be transmitted for playback on a computing device.

20 Claims, 11 Drawing Sheets

(56) References Cited

U.S. PATENT DOCUMENTS

| | | | |
|---|---|---|---|
| 2014/0022394 A1* | 1/2014 | Bae | G06K 9/00771 |
| | | | 348/169 |
| 2014/0161354 A1* | 6/2014 | Curcio | G06K 9/00718 |
| | | | 382/190 |
| 2014/0270482 A1* | 9/2014 | Chakraborty | G06K 9/00221 |
| | | | 382/154 |
| 2015/0110387 A1* | 4/2015 | Lienhart | G06K 9/6228 |
| | | | 382/159 |
| 2016/0057363 A1* | 2/2016 | Posa | H04N 1/2112 |
| | | | 348/239 |
| 2016/0350336 A1* | 12/2016 | Checka | G06K 9/6215 |
| 2017/0017857 A1* | 1/2017 | Wolf | G06K 9/4628 |
| 2017/0109584 A1* | 4/2017 | Yao | G06K 9/00718 |
| 2017/0337271 A1* | 11/2017 | Lee | G06K 9/6276 |
| 2018/0146198 A1* | 5/2018 | Atluru | G06K 9/00711 |
| 2019/0171886 A1* | 6/2019 | Ashour | G06K 9/00765 |

\* cited by examiner

CONFIDENCE-BASED ENCODING

BACKGROUND

Encoders provide conversion of signals from one form to another. For example, certain types of encoders convert an input signal comprising data of a first format to an output signal comprising data in a second format. Such encoders enable a receiver, which is only capable of processing signals of the second format, to receive and reproduce a data and signal that is originally in the first format. As such, the output stream of an encoder is a bit stream comprising bits representative of audio or video data. In addition, encoders are also available to provide high quality bit streams for reproduction on the receiver side. Bit streams are, however, subject to limitations of the transmitting media. The limitations of the transmitting media result in induced latency, delays, and errors of the high quality bit stream.

BRIEF DESCRIPTION OF THE DRAWINGS

Various embodiments in accordance with the present disclosure will be described with reference to the drawings, in which.

DETAILED DESCRIPTION

Figure 1A:
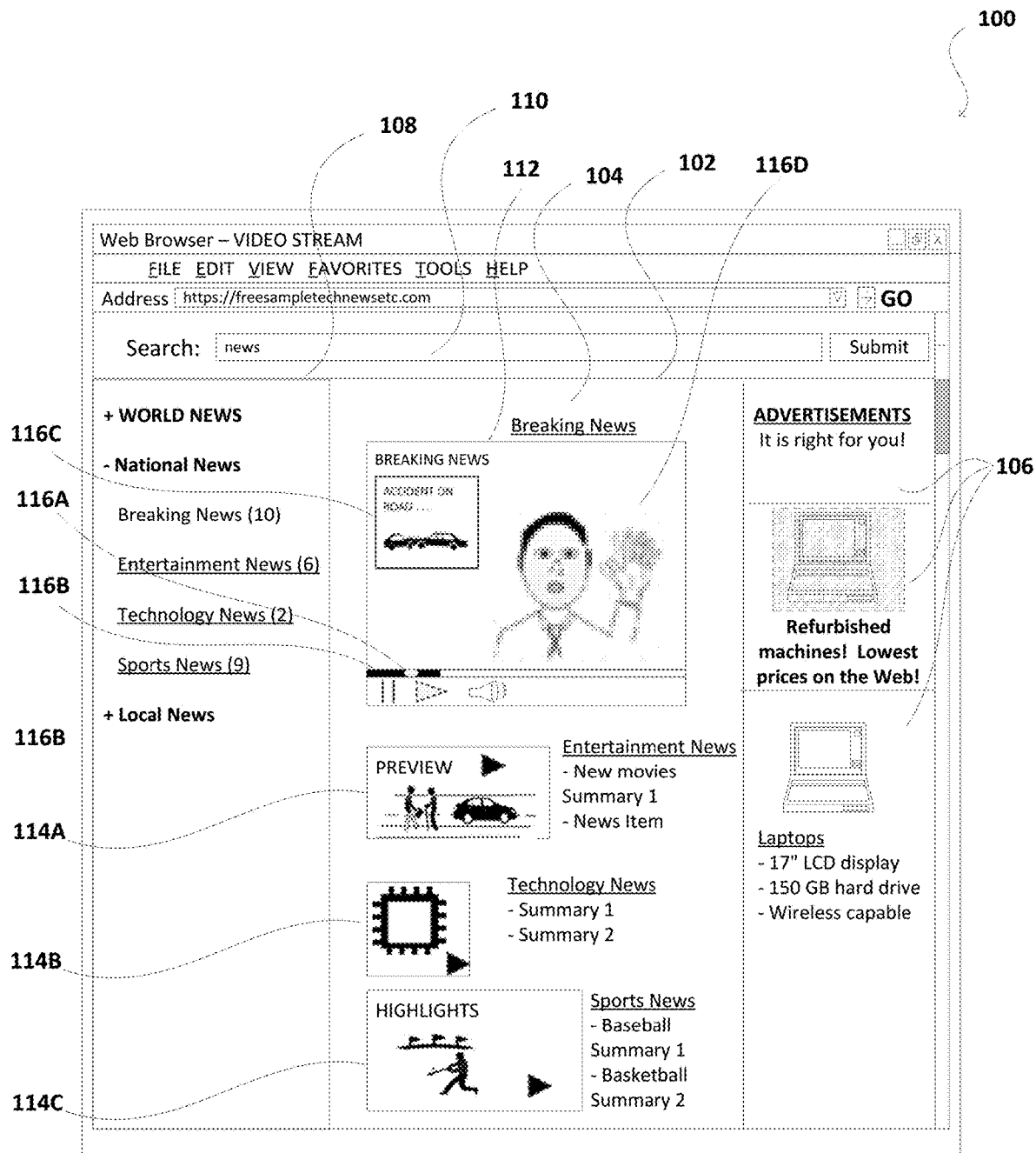
FIG. 1A illustrates an example of an application window with a website and a streaming video in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to encoding signals in an electronic environment. In an example, the systems and methods herein provide encoding for video signals by allocating bits to specific regions-of-interest (ROIs) using semantic similarity classification and confidence measures from the semantic similarity classification. As a result, bit streams of encoded video signals of the present disclosure overcome latency, delays, and errors, by providing additional video information for ROIs, and by providing relatively less video information for other parts of the video signal that are classified by the semantic similarity classification as non-ROIs or that are merely not classified as ROIs by the semantic similarity classification. The amount of additional video information for ROIs is dynamically determined by the confidence measures associated with the ROIs from the semantic similarity classification. Such encoded video signals demonstrate a perceptive quality improvement over traditional bit streams without requiring additional bandwidth.

In an embodiment, the ROIs for a video stream are determined using semantic similarity of a scene represented in the video signals, when classified against stored class types. An application of semantic similarity includes a confidence measure of a fit of features from scene components of the scene against at least a two-dimensional feature-based classification algorithm. In an example, the two-dimensional feature-based classification algorithm may include spatial and temporal features. The two-dimensional feature-based classification algorithm may be obtained by supervised or unsupervised learning such that prior features of prior scene components are classified in regions of the two-dimensional features-based classification algorithm. Scene features may include objects, movements, colors, segments, and related information obtained from video data. In addition, scene features may be obtained from between frames of the video data. Based at least in part on a complexity in the scene, a predetermined number of features may be selected to suitably differentiate scenes. In such an implementation, a multi-dimensional features-based classification algorithm may be appropriate to fit an input scene within a confidence measure. Once the ROIs are determined, bits are allocated according to the ROIs and the confidence measures to ensure that pixels in regions of interest are transferred with more allocated bits than other regions. Such regions with more allocated bits are perceptively sharper and more detailed in the playback than the other regions.

Various other functions can be implemented within the various embodiments as well as discussed and suggested elsewhere herein.

FIG. 1A illustrates an example of an application window 100 with a website or webpage 102 and a streaming video 112 in accordance with various embodiments. In an example, the window 100 may be a web browser or a stand-alone application for interacting with digital content. A user may search or interact with the digital content via a search field 110. A query in the search field 110, in one implementation, allows the user to find a website 102 offering searching or the requested digital content. In example 100 of FIG. 1A, a query for "news" is entered into the search field 110, and the search results are provided in the results section 104 of the website 102. Alternatively, a webpage or website address is provided in the ADDRESS bar when the application window 100 is of a web browser application. The news website 102 may then be a resulting website from the host servers associated with the webpage or website address. As illustrated, there may be additional results 114A-C on display, with an indication (e.g., down arrow or a scroll indicator on the right of the webpage 102) for more results if the page was scrolled down. In the website or webpage 104, sponsored content, such as advertisements, may be displayed on other available area 106, while categories of the search results may be displayed in a separate section 108.

The streaming video 112 is provided to illustrate an implementation of the confidence-based encoding disclosed herein. For example, the streaming video 112 may be scripted to auto-play video upon rendering of the webpage 102. A progress indicator, illustrated as a small white marker 116A over a progress bar 116B, may represent the current position of the video. The solid portion of the progress bar 116B may represent the loaded content of the video on the device hosting the browser. In an alternative implementation, the solid portion of the progress bar 116B represents the loaded content buffered in a virtual or physical buffer area of the browser application. Further, the streaming video 112 may include one or more scene components—illustrated as a person's head with a gesturing hand or palm 116D and a background portion 116C.

The streaming video 112 is also illustrated as showing blurry content of at least one scene component—the person's head with a gesturing hand 116D. The scene represented in the streaming video 112 appears, however, to be a breaking news segment with the person appearing to be a news reader with a background person 116C providing a news items to which the news reader is presenting a segment. The present confidence-based encoding uses class types to determine the scene based on multiple ones of the above-referenced scene components. As such, the class types may be one or more multi-dimensional features-based classification algorithm(s), each with trained data sets corresponding to different scenes. For example, each class type may be one multi-dimensional features-based classification algorithm with one or more corresponding trained data sets. The video data representing the scene may be tested against each one of the multi-dimensional features-based classification algorithm to determine the scene types. In an example, and as further discussed with reference to FIG. 3C, class types may include NEWS/TALKING HEAD, ACTIONS—HUMAN or VEHICLES, INDOOR SPORTS, OUTDOOR SPORTS, LANDSCAPE SCENES, etc. The output of the multi-dimensional features-based classification algorithm may include class types with confidence measures for the scene or video segment in the video data.

The class types with higher confidence measures are used to determine the selection of a subset of most suitable ROIs for the scene or video segment in the video data. Application of the subset of most suitable ROIs to the scene selects ROIs and their corresponding confidence measures. With determination of the specific class type and a confidence measure corresponding to the fit of the specific class type and the scene, the present confidence-based encoding system improves the streaming video 112 by providing additional bits which enable additional information in the bit stream as to specific ROIs of the scene. In an example, ROIs with higher confidence measures receive more bits than ROIs with lower confidence measures, and such high confidence measure ROI regions are transferred or streamed with more allocated bits. In a further example, the head portion of the streaming video 112 may be allocated more bits in the bit stream than the rest of the streaming video 112. In a further aspect, as the video progresses, the ROIs may change—such as the palm gesturing may become more of an ROI than the head portion. As a result, an ROI change is effected dynamically to allocate more bits to the hand portion of the streaming video 112. The use of adaptive ROI and bit allocation ensures perceptive quality improvements to the viewer of the streaming video 112 by focusing on scene components to which the viewer may typically focus.

Figure 1B:
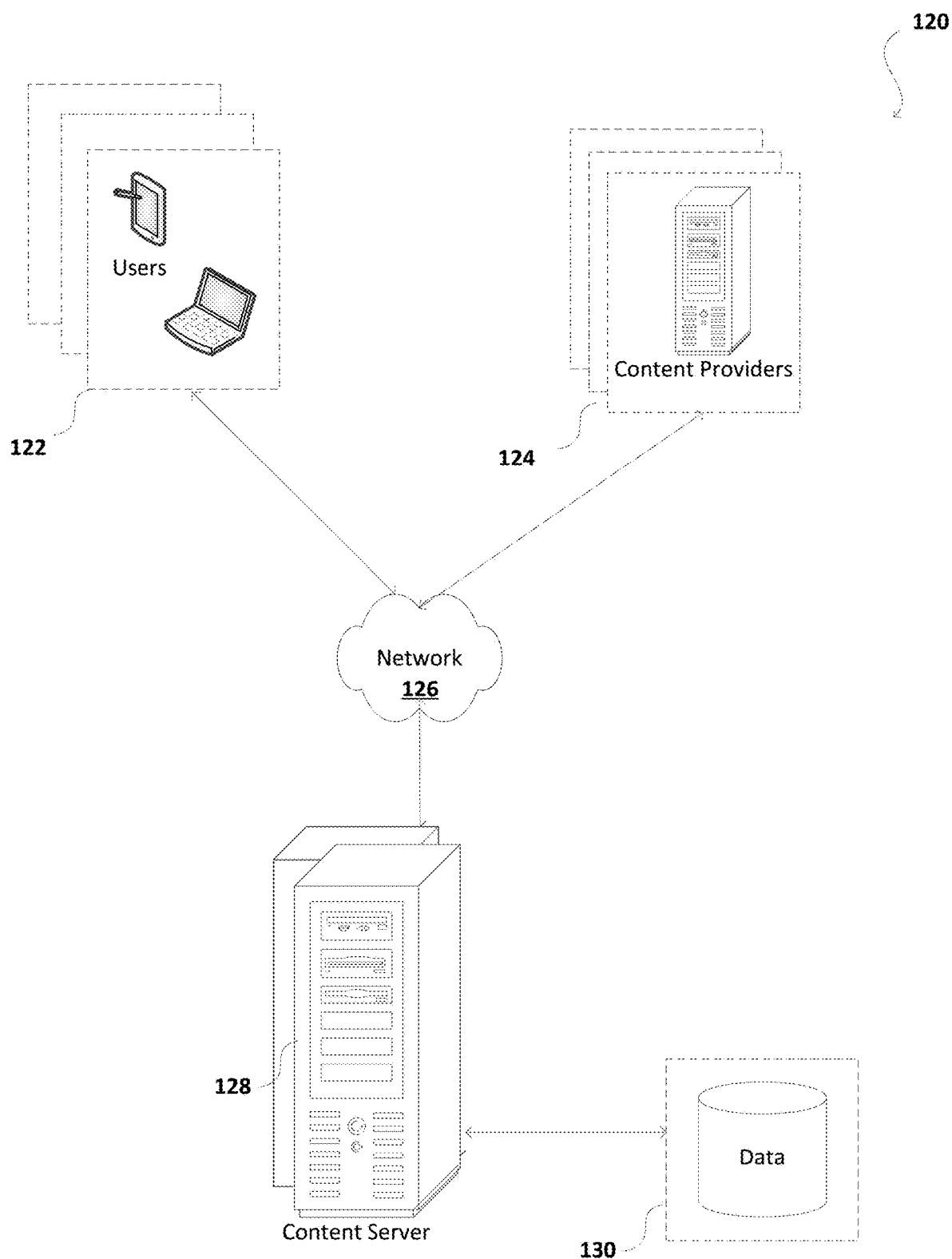
FIG. 1B illustrates an example system architecture for performing the disclosed embodiments in accordance with an aspect of this disclosure.

FIG. 1B illustrates an example system architecture 120 for performing the disclosed embodiments in accordance with a further aspect of this disclosure. The system architecture 120 includes content providers 124 in communication with content servers 128 and with client devices 122, via network 126. The content providers 124 provide content, such as a video, audio, and other media for confidence-based encoding. In addition, the content providers 124 may incorporate features of the content servers 128, as discussed subsequently herein, to process content in a similar manner as the content servers 128. As such, the content providers 124 may be able to provide content directly to the client devices 122 via network 126, such as the internet. Client devices 122 and content provider devices 124 can include processor and memory based electronic devices with capabilities as disclosed herein, but at least with the capability to execute computer-readable instructions in a browser or to execute computer-readable instructions with or without a browser. In addition, such devices 122/124 are configured to encode and/or decode media according to the presently disclosed confidence-based encoding.

Further, the electronic devices 122/124 are described in detail below with respect to components and features, but at least may include specific configuration to perform the functions herein. The electronic devices 122/124 may include personal computers, tablets, ultrabooks, smartphones, cell phones, wearable watches and related devices, handheld messaging devices, laptop computers, set-top boxes, personal data assistants, electronic book readers and the like. Each of these electronics devices 122/124 may be configured to include a browser or a stand-alone application that is capable of being configured in the manner of this disclosure. In an implementation, content providers 124 may use the content server 128 to run tests on hardware and software features or services (including, for example, latency tests on media delivery) offered in the system architecture 120. Users or consumers of electronic or online products and/or services use the client devices 122 to interface with a website or stand-alone application providing such media content. The content server 128 may include a database or any data storage component 130 configured for storing volumes of media content from users 122 and content providers 124.

Network 126 can include any appropriate network, including an intranet, the internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such system architecture 120 can depend at least in part upon the type of network and/or environment selected. Protocols and components for communicating via such a network are well known and will not be discussed herein in detail. Communication over the network 126 can be enabled via wired or wireless connections and combinations thereof. In this example, the content server 128 may include one or more local servers in communication with each other and with other remote servers via the network 126. In an example, the content server 128 includes a web server for receiving requests and serving content from the client devices 122 and/or the content providers 124. In response thereto, although for other networks, an alternative device serving a similar purpose as any one of the content server 128 could be used, as would be apparent to one of ordinary skill in the art upon reading this disclosure.

Figure 2:
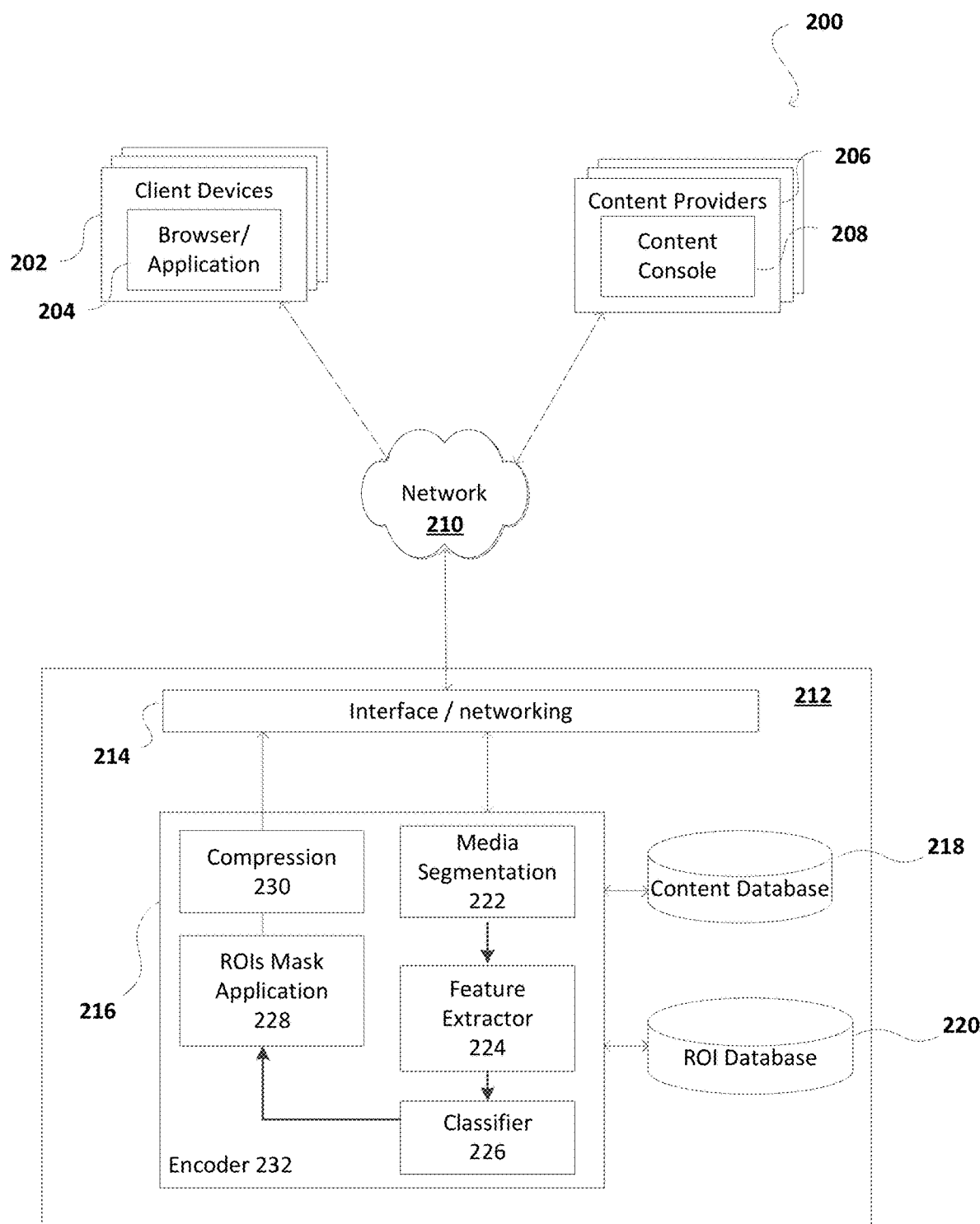
FIG. 2 illustrates an alternate example system architecture for performing the disclosed embodiments in accordance with another aspect of this disclosure.

FIG. 2 illustrates another example system architecture 200 for performing the disclosed embodiments in accordance with another aspect of this disclosure. The system architecture 200 offers more detail as to the specific confidence-based encoding offered via the content server 212. In an example, content server 212 is analogous of content server 128, and performs the same hosting and processing functions as described with respect to content server 212. For example, content server 212 may receive media from users via client devices 202 and from content providers 206. Content server 212 is configured to, using at least components 222-228, process the received media to generate a bit stream that is subject to confidence-based encoding for playback on other client devices 202 that request the bit stream. In an example, the client devices 202 receive the bit stream that is encoded by the disclosed confidence-based encoding herein. The client devices 202 decode the bit stream based at least in part on the allocated bits and provide the bit stream for a display device of (or attached to) the client device 202.

In an example, the content providers 206 may include a content console 208 for communicating with the content server 212. The content console 208 may be an internet-enabled application (e.g., browser/stand-alone application) that is configured to execute on the content provider 206 and is configured to communicate with the content server 212 in the manner described herein. The communications between the content server 212 and the servers/devices of content providers 206 may be via an interface or networking component 214, such as a network interface card or a wireless interface. In alternate embodiments, part of components 214-232 of the content server 212 is maintained internal and confidential between the content providers 206 and the content server 212 during a configuration or testing stage for latency. Accordingly, one or more components or modules in the content server 212 are isolated from external influence by any known security methods, including firewalls, during configuration stages.

In an alternate aspect, sections of the one or more components or modules 214-232 in the content server 212 are available to one or more content providers 206 for testing of media delivery from the content server 212 of media owned by the content providers 206. In yet another alternative implementation, sections of the one or more components or modules in the content server 212 may be secure, while other sections of the one or more components or modules may be available in the public domain to interface with client devices 202. In accordance with such alternate implementations, one or more components or modules in system architecture 200 may also be virtual machines or operate in a virtual environment for performing one or more of the features disclosed herein.

In an implementation, media streams, including audio, video, moving images, and other applicable media is provided to the encoder 232. Encoder 232 may receive such media streams from external devices 202/206 in real time or may receive such media streams from the content database 218. The media stream is segmented in groups of bits. In an example, when the media stream is a video comprising video data, the groups of bits is interchangeably used with video segments, and may include groups of pixels, macroblocks, or frames depending on how the video segments are grouped together. When the media stream is audio, the groups of bits comprise a select wave of audio data. When the media stream is a group of images, then the group of bits may be groups of pixels or macroblocks. Each of the segments is subject to processing comprising a feature extraction via feature extraction module 224. In an example, the processing may occur concurrently for each of the segments. In yet another example, the processing may occur in a predetermined order for the segments.

In an implementation, the confidence-based encoding of the present disclosure may be applied to media content received at encoder 232 from external devices 202/206, or to media content from content database 218. When media content, such as video, is received from either the external devices or the content database, it is first segmented to groups of pixels or bits using media segmentation module 222. For example, media segmentation module 222 may include scripts of instructions to parse blocks or frames of bits for the media content. The blocks or frames, representing groups of pixels or bits may be a predetermined contiguous set of pixels or bits. Once segmented, feature extractor module 224 includes algorithms to extract discriminant features of each of the groups of pixels or bits. In an example, the feature extractor module 224 eliminates redundancies between the groups of pixels or bits and uses unique sub-portions of the groups of pixels or bits for classification. The uniqueness may be based on relationships between information contained in the pixels or bits. For example, properties of a pixel relative to its immediate neighbors or value in a bit relative to its immediate neighbors may be considered unique. Such use of information relative to neighbors enables a classifier to find patterns than merely relying on comparing information from pixels or bits, as plainly provided. Consequently, a classifier applied to classify uniqueness in relationships for each of the groups of pixels or bits may be referred to performing semantic classification. In contrast a regular classifier may seek to use information from pixels or bits as they are presented.

In FIG. 2, classification is performed by algorithms in the classifier module 226. In an example, the algorithms in the classifier module 226 include classification functions, clustering functions, or any applicable pattern recognition algorithm. In an implementation, the algorithms in the classifier module 226 may include neural networks (NNs), support vector machines (SVMs), and other supervised or unsupervised machine learning algorithms. In an example, when the classifier module 226 implements NNs and SVMs, then probability of classification is used as the confidence measures in the confidence-based encoding. The classifier module 226 classifies the extracted features from the feature extractor module 224. In addition, as the features extracted represent unique sub-portions of the groups of pixels or bits, as per their relative information, and so, classifier module 226 may be a semantic classifier. The classification information obtained from classifier module 226 is used to determine class types for the media represented in the media stream of the pixels or bits. For example, when the media is a scene of a video, then the determined class type may correspond to a news reader scene or a talking head, an action scene with humans or vehicles, a sports scene, or landscape scenes. Such determination occurs via one or more sub-modules forming the ROIs mask application module 228.

Along with the classification, confidence measures are determined depending on the fit in the classification. For example, if there are feature points outside a predetermined fit area of a multi-dimensional features-based classification map represented by a multi-dimensional features-based classification algorithm, then those outlier feature points may be used to calculate a confidence measure. The more the outlier feature points, the lesser the confidence measure—indicating that a classification that has occurred is not the best fit. In aspects of this disclosure, the classification, without a perfect fit, may still be used as the confidence-based encoding ensures that such confidence measures are subsequently applied during bit allocation and is, therefore, accounted for in the encoding process.

The ROIs mask application module 228 extracts ROI masking data corresponding to the determined class type. Such extraction may be possible by a mapping of the class types and ROIs stored in the ROI database 220. Such mapping may also consider the above-referenced confidence measures to select the appropriate ROI masking data. For example, as illustrated in FIG. 3 and described in the related portion of this disclosure, class types may be mapped to one or more ROIs and applying each ROI to the video segment under processing provides corresponding masking data with confidence measures. In one aspect, news reader scene or a talking head may be mapped to face detectors and/or human detectors. As a result, ROIs mask application module 228 extracts the masking data associated with the face detectors and/or the human detectors portion of the ROI database 220. The ROIs mask application module 228 may apply the masking data to allocate more bits to certain ROI and lesser bits to other regions of the example video media stream. Similarly, when the media stream is not video, the certain bits of a non-video media stream may be transmitted without change, while other bits in the media stream may be altered in accordance with the masking data and confidence measures. In addition, as the ROI masking data is selected using the class type and may incorporate the above-reference confidence measure, a further confidence measure applies to indicate that the masking data may not be an exact fit to the class type. Two confidence measures are therefore applied to the bit allocation. For example, two confidence measures may be combined and applied to support the bit allocations for various segments during the encoding process.

Further, in the example architecture 200 of FIG. 2, real-time or dynamic changes are processed for media in accordance with determined class types for scenes or bit portions represented in the media. As such, adaptive encoding is applied using the encoder 232, by dynamically changing the bit allocations for ROIs for the output bit stream. In an aspect, the dynamic changes are addressed in real-time or dynamically via classifier 226, which may include a machine learning module. Specifically, classifier 226 may be one or more sub-classifiers—each configured to determine a scene or media in the media stream. In addition, each of the one or more sub-classifiers may be taken out of commission and trained to improve accuracy of the fit as to a new scene represented in constantly changing media content provided for encoding. As a result, classification data for the classifier 226 may be stored in the ROI database 220, while new media content may be stored in the content database 218.

In an implementation, the classifier 226 may cooperatively function under two or more modes. In one of the modes, the classifier 226 may constantly improve upon itself using new media content provided to its machine learning algorithm. This ensures robust functionality of the classifier 226. Such a mode may be referred to as a training mode. In an application of neural networks for the machine learning operations, the classifier 226 may train one or more neural networks with the new media content while running active operations with a copy of an active previously-trained neural network. Once the new query and newly modified content has been trained to one or more inactive neural networks, the one or more inactive neural networks may be activated and the previously-trained neural networks may be inactivated for training. Alternatively, bulk media content from a content database 218 is also available to train one or more neural networks during an assigned downtime. In addition, the ROI masking data may be updated in a similar manner to reflect new scene components. For example, face detectors of the ROI database 218 may be a trained neural network or a classified cluster of data. The face detectors may, however, be updated with new information when the new media content includes faces. Such updating processes to the ROI masking data may be supervised or unsupervised.

In addition to encoding or part of the encoding process, encoder 232 includes compression module 230 to further process a bit stream output from the ROIs mask application module 228. For example, the encoder 232, following the application of the ROI masking data, allocates bits for various portions of an input media stream as part of a compression scheme applied via the compression module 230. As such, the bit stream from encoder 232 is provided from the compression module 230 as per the bits allocated based at least in part on the ROIs mask application module 228. Certain standard features of an encoder are not discussed but are understood as included in the encoded 232. For example, a bit stream may be multiplexed with similar bit streams for each of the groups of bits or pixels, resulting in a single bit stream from the encoder 232. For example, the modules 224, 226, 228, and 230 are configured to concurrently process multiple bit streams, each corresponding to a segment from the media segmentation module 222. Thereafter, a multiplexer that is either within compression module 230 or separate from compression module 230, multiplexes the multiple bit streams to provide a singular stream. A quantization module may be available to receive analog signals and provide quantized signal for subsequent processing as the media bit stream as described in prior sections of this disclosure. Filter banks may be provided to filter a media bit stream or to filter received analog signals to remove noise or to select areas for application of the confidence-based encoding.

In content server 208, the queries may be analyzed in the machine learning module 212 to determine identifiers of a first semantic relationship, such as noun identifiers. The determined identifiers and a database of terms in the content storage 218 are used to find second semantic relationships. For example, the database of terms includes a number of terms that may have a semantic relationship with the identifiers. The semantic relationships are comprised of measures that are then applicable to provide semantic terms. In an implementation, the semantic terms are then used (in addition to the query or instead of the query) to search the content storage 218 for relevant content. For example, a product database, different from the database of terms, may be used for the search with the semantic terms. Alternatively, the database of terms may be combined with the content database for additional economy and efficiency.

Figure 3A:
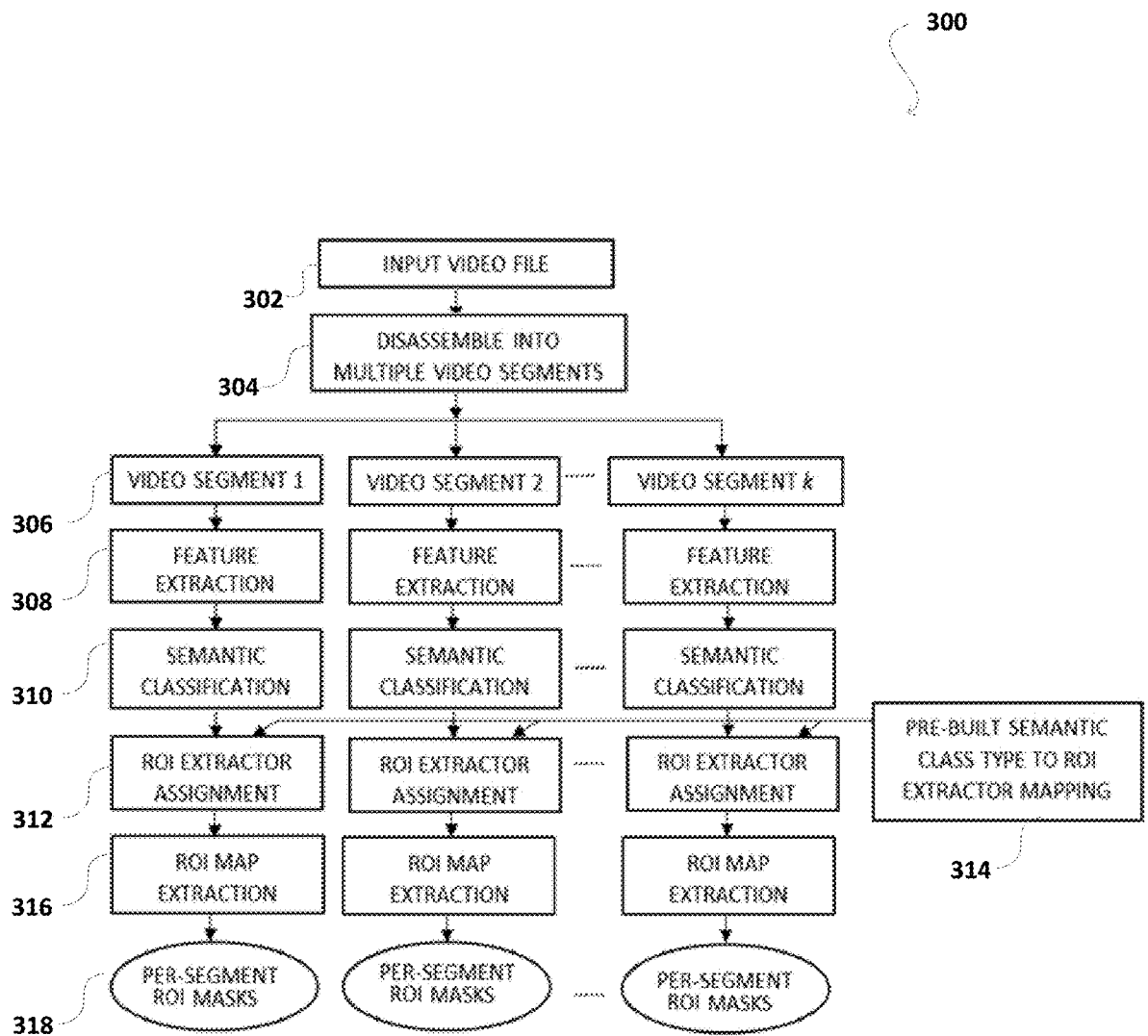
FIG. 3A illustrates an example flow diagram of selecting regions-of-interest (ROI) masks in a video media stream as part of a confidence-based encoding in accordance with various embodiments.

FIG. 3A illustrates an example flow diagram 300 of selecting regions-of-interest (ROI) masks in a video media stream as part of a confidence-based encoding in accordance with various embodiments. As described with respect to FIG. 2, ROI masks are also referred to herein as ROIs masking data. In addition, a video media stream or a video file refers to, and is used interchangeably with, dynamic bits of media information transmitted in real time from client devices or content providers 202/206 or static bits of media information from the content database 218. The example sub-processes 302-318 may be performed via the example sub-modules 222-228 of example encoder 232 in FIG. 2.

In FIG. 3A, an input file is provided to sub-process 302. Sub-process 304 disassembles the video file in multiple video segments, which transmits through sub-processes 306. Video segments in sub-processes 306 generally transmit the video segments in parallel streams referred to as video segment 1, video segment 2, . . . video segment k in FIG. 3. The video segments may be frames, macroblocks, or groups of pixels. The groups of pixels may be predetermined or may be dynamically determined during the sub-process 304. Further, while the sub-processes 306 are illustrated as transmitting the video segments in a parallel manner, serial or pre-determined transmission times may be used instead. When serial or pre-determined transmission times are used, the video segments are processed at different times than at the same time. Such different times may be overlapping or contiguous for transmitting the video segments.

Feature extraction sub-processes 208 perform feature extraction as previously described with respect to FIG. 2. As with the sub-processes 306, the feature extraction sub-processes 308 occur in parallel or at different times, and may including at overlapping or contiguous times. Sub-processes 310 perform semantic classification for the extracted feature information from each of the sub-processes 308. Sub-process 314 performs the determination for class type using the classification from sub-processes 310, and then provides the ROI masking data for mapping with the determined class types. As described with respect to FIG. 2, the classification in sub-processes 310 also provides a first confidence measure reflecting the fit of the classification process. As the video stream typically carries a video that has related portions in the video file, the sub-process 314 need not repeat for each of the sub-processes 310. Instead, the sub-process 314 may use classification information from one of the sub-processes 310. However, in an alternative aspect, sub-process 314 may be coded with different modes corresponding to different ways of utilizing the classification information. In one example mode, the sub-process 314 may be coded to cycle between classification information from each of the sub-processes 310. In another example mode, the sub-process 314 may be coded to use classification information from all the sub-processes 310. As such, depending on economy and time required for processing, the sub-processes 314 may be programmed to rely on the different modes.

ROI extractor assignment in sub-processes 312 then uses respective ROI masking data from sub-process 314 to assign the respective ROI masking data to regions of each respective video segment 1, 2 . . . k. Also, as described in FIG. 2, the ROI extractor assignment of sub-process 312 includes second confidence measures corresponding to the of the ROI masking data determined for the class types via sub-process 314. Sub-processes 316 performs mapping, based at least in part on the assignment from sub-processes 312, of the respective ROI masking data to regions of each respective video segment 1, 2 . . . k. Sub-processes 318 provide per-segment ROI masks from the mapping of sub-processes 316.

Figure 3B:
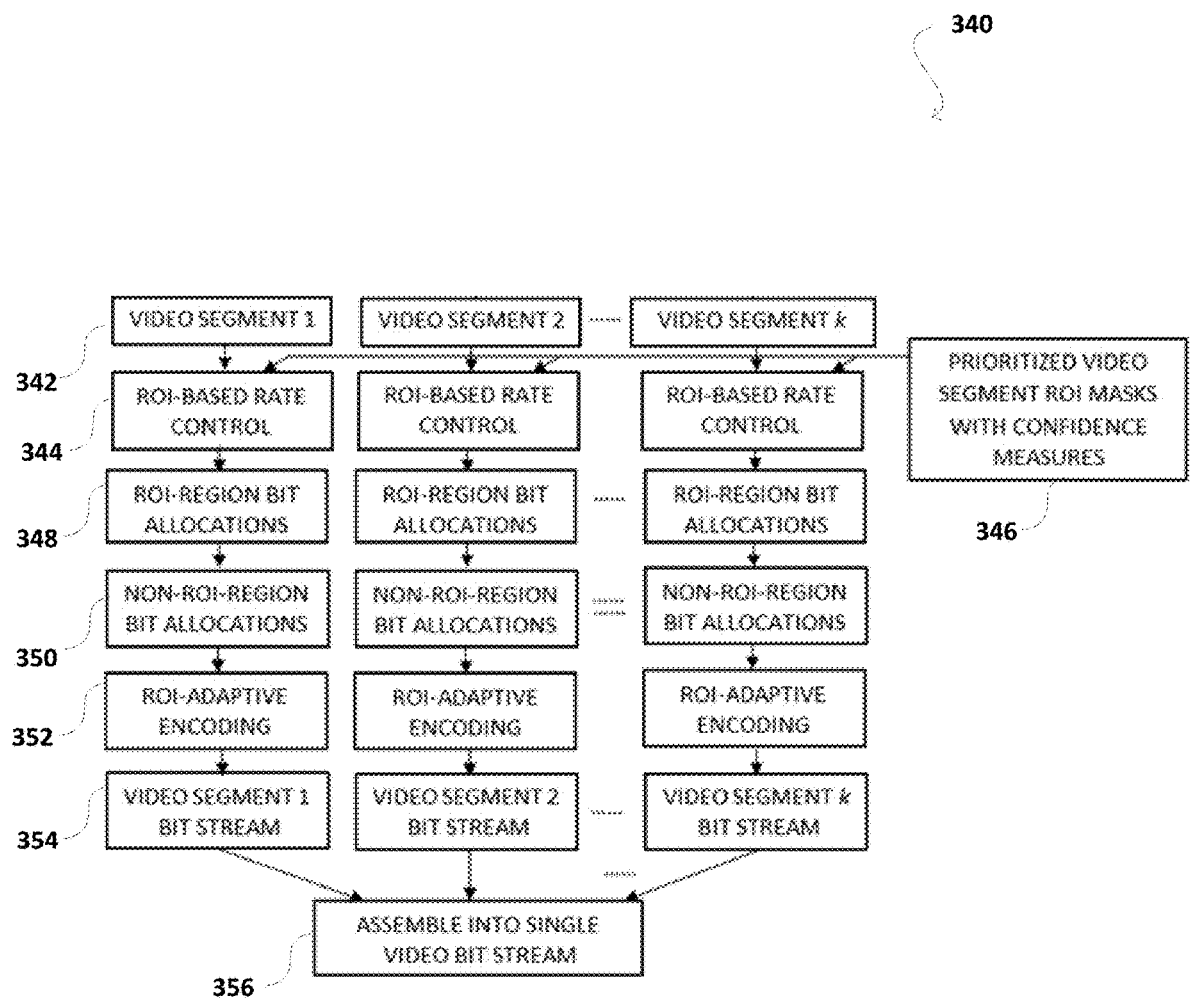
FIG. 3B illustrates an example flow diagram of applying selected regions-of-interest (ROI) masks in a video media stream as part of a confidence-based encoding in accordance with various embodiments.

FIG. 3B illustrates an example flow diagram 340 of applying selected regions-of-interest (ROI) masks in a video media stream as part of a confidence-based encoding in accordance with various embodiments. The example flow diagram 340 may occur as following from the example flow diagram 300. Alternatively, portions of the video segments in the example flow diagram 300 may be subject to the process of the example flow diagram 340 at different times—either overlapping or in a contiguous manner. In FIG. 3B, video segments transmit via sub-processes 342. Sub-process 346 provides indications of prioritized video segment or segments using the ROI masks and confidence measures discussed previously with respect to FIGS. 2 and 3A. Sub-processes 348 provide the ROI-based rate control for the pixels or bits of the video segments from sub-processes 342. For example, sub-processes 348 may secure indications of which regions are to be allocated more bits than other regions in the pixels or bits of the video segments. In accordance with the indications from the sub-process 346, the rate control is achieved to the video segments.

Sub-processes 350 provide bit allocations for the remainder of the regions not forming the ROI as identified by the sub-process 346 for the pixels or bits of the video segments from sub-processes 342. Sub-processes 352 provides adaptive encoding for the ROIs based at least in part on the bit allocations from sub-processes providing the bit allocations 438 and 350. Sub-process 354 provides the adaptive bit stream output for each of video segments 1, 2, . . . k to a sub-process 356 for assembly into a single video bit stream. In an example the assembly may be via a multiplexer—as described with reference to FIG. 2.

Figure 3C:
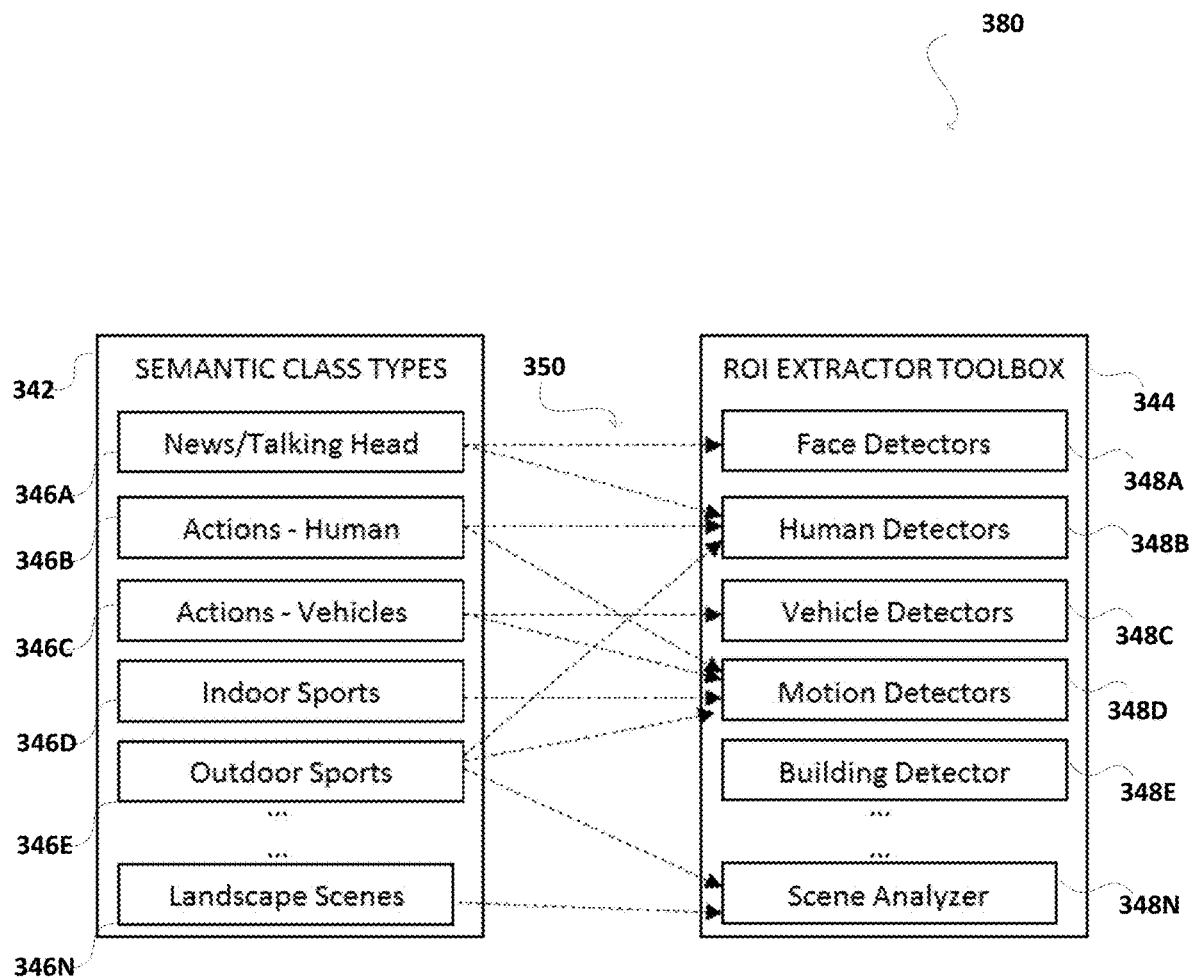
FIG. 3C illustrates example mapping of semantic class types with an ROI extractor toolbox for a video media stream as part of a confidence-based encoding in accordance with various embodiments.

FIG. 3C illustrates example mapping 380 of semantic class types 342 with an ROI extractor toolbox 344 for a video media stream as part of a confidence-based encoding in accordance with various embodiments. In an example, the extractor toolbox refers to, and is used interchangeably with, a data set, classified data set, or classified data with masking data. The classified data provides data points that are recognized as corresponding to identified scene components or features by one or more multi-dimensional features-based classification algorithms. For example, a class types 346A-N provides class types that a scene may classify into. Once the class types are identified for a scene, ROI masking data is provided by predefined mapping 350, as illustrated in FIG. 3C. In an example, the predefined mapping 350 may be by polling of the number of scene components 348A-N that may be found in scenes 346A-N over a time period. Every occurrence of a scene component from scene components 348A-N in a scene provides a likelihood of mapping the scene component to the class type represented by that scene.

Figure 4:
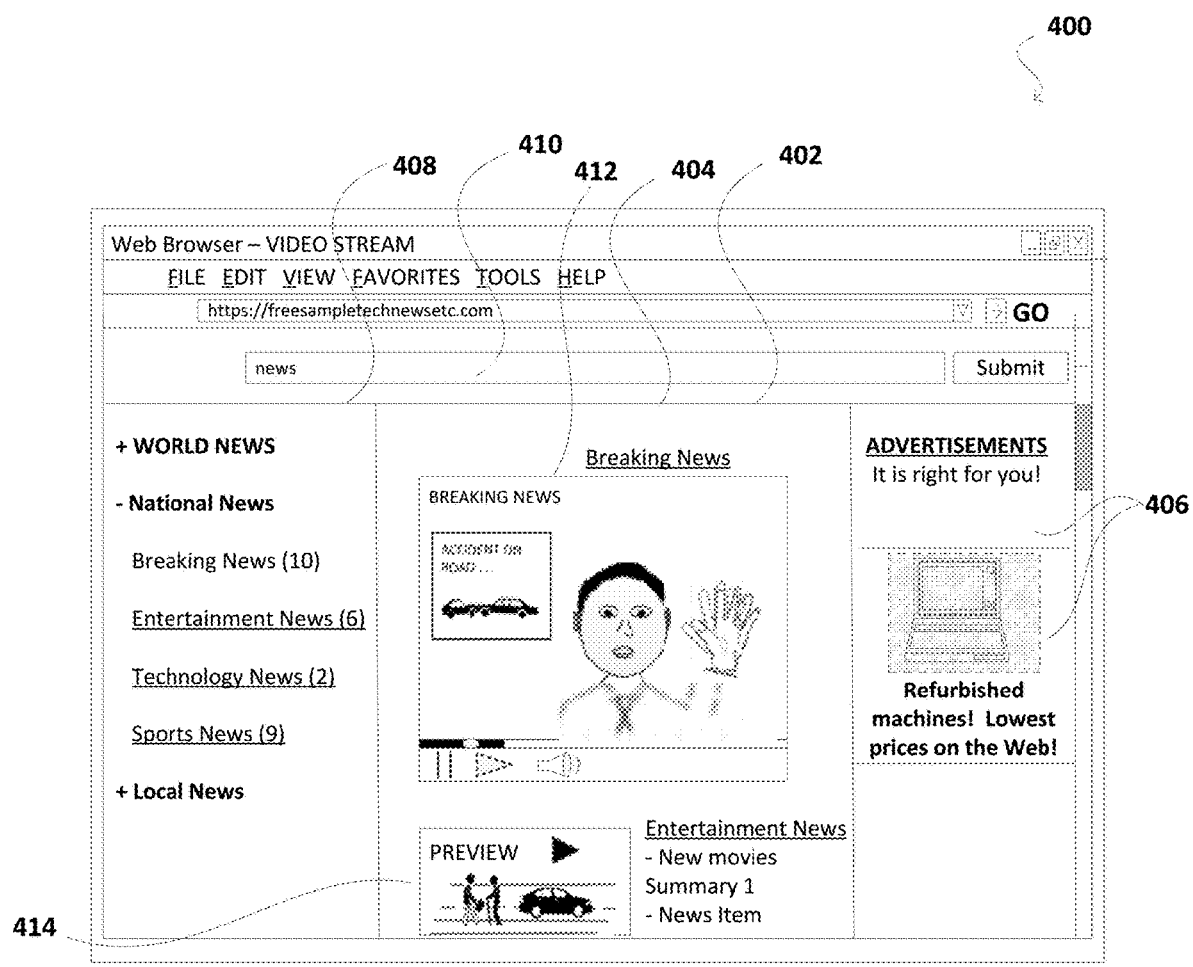
FIG. 4 illustrates an example of an application window with a website and a streaming video in accordance with various embodiments.

FIG. 4 illustrates an example of an application window 400 with a website 402 and a streaming video 112 in accordance with various embodiments. The example in FIG. 4 may be compared to the example of FIG. 1A, in view of the following description. In an example, the window 400 may be a web browser or a stand-alone application for interacting with digital content. A user may search or interact with the digital content via a search field 410. A query in the search field 410, in one implementation, allows the user to find a website 402 offering searching or the requested digital content. In example 400 of FIG. 4, a query for "news" is entered into the search field 410, and the search results are provided in the results section 404 of the website 402. Alternatively, a webpage or website address is provided in the ADDRESS bar when the application window 400 is of a web browser application. The news website 402 may then be a resulting website from the host servers associated with the webpage or website address. As illustrated, there may be additional results, e.g., reference numeral 414, on display, with an indication (e.g., down arrow or a scroll indicator on the right of the webpage 402) for more results if the page was scrolled down. In the website or webpage 404, sponsored content, such as advertisements, may be displayed on other available area 406, while categories of the search results may be displayed in a separate section 408.

The streaming video 412 is provided to illustrate an implementation of the confidence-based encoding disclosed herein. For example, in contrast to the streaming video 112 of FIG. 1A, the streaming video 412 is displayed with a clearer face and gesturing hand. Specifically, the streaming video 412 has been processed or is being processed and provided such that the face and gesturing hand have higher bit allocations because viewers typically focus on these regions for this type of scene—i.e., news reader scene. As a result, a perceptive improvement is in the quality of streaming video that is provided without much loss in bit economy. An example of such a streaming video averages at least 30 fps but could also average 25 fps and higher. In a further example, as also illustrated in streaming video 412, other scene components that are not typically of focus during viewing remain blurred because of lesser bit allocation than the head and gesturing hand areas. In another example, the encoding of the present implementation provides an average frames per second (fps) or frame rate of at least 30 fps. In another example, the encoding of the present implementation provides an fps of at least 25 fps. As a result, the perceptual quality is improved without visible delay or re-buffering of the streaming video.

The streaming video 412 is, therefore, displayed with a mix of bit allocations—with the person's head and gesturing hand or palm receiving the highest bit allocation. The scene represented in the streaming video 412 is determined as belonging to a class type using the sub-processes described in FIGS. 3A-C. Once determined, the present confidence-based encoding uses the class type or class types and their associated confidence measures to determine the scene based on multiple ones of the above-referenced scene components 348A-N described in FIG. 3C. As such, the class types may be one or more multi-dimensional features-based classification algorithm(s), each with trained data sets corresponding different scenes. For example, each class type may be one multi-dimensional features-based classification algorithm with one or more corresponding trained data sets. The video data representing the scene may be tested against each one of the multi-dimensional features-based classification algorithm to determine the scene. In the example of FIG. 4, and as discussed with reference to FIG. 3C, the class type is first determined as news/talking head from a set of class types that include NEWS/TALKING HEAD, ACTIONS—HUMAN or VEHICLES, INDOOR SPORTS, OUTDOOR SPORTS, LANDSCAPE SCENES, etc.

With determination of the specific class type and a confidence measure corresponding to the fit of the specific class type and the scene, the present confidence-based encoding system improves the streaming video 412 by providing additional bits which enable additional information in the bit stream as to specific ROIs of the scene. For example, the head portion of the streaming video 412 may be allocated more bits in the bit stream than the rest of the streaming video 412. In a further aspect, as the video progresses, the ROIs may change—such as the gesturing hand may become more of an ROI than the head portion. As a result, an ROI change is effected dynamically to allocate more bits to the gesturing hand portion of the streaming video 412. The use of adaptive ROI and bit allocation ensures perceptive quality improvements to the viewer of the streaming video 412 by focusing on scene components to which the viewer may typically focus.

Figure 5A:
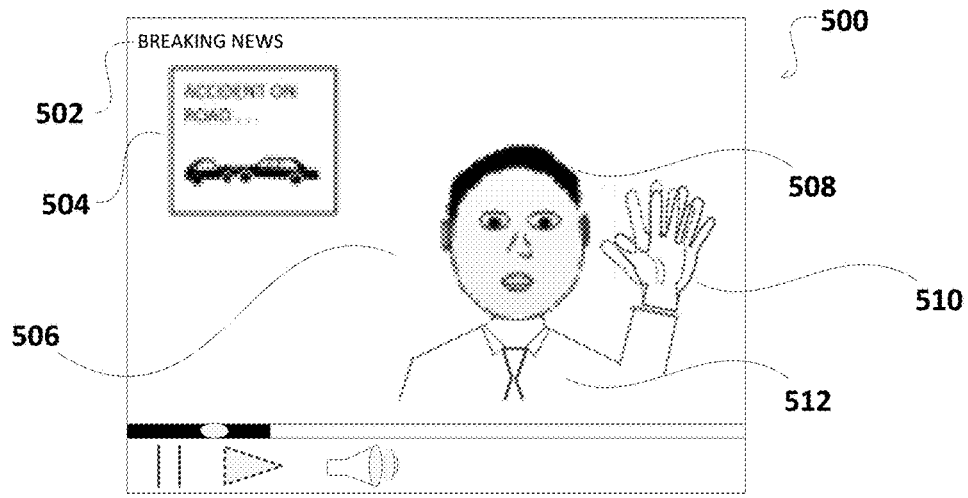
FIGS. 5A-C illustrate example streaming videos with different effects from applied confidence-based encoding in accordance with various embodiments.
Figure 5B:
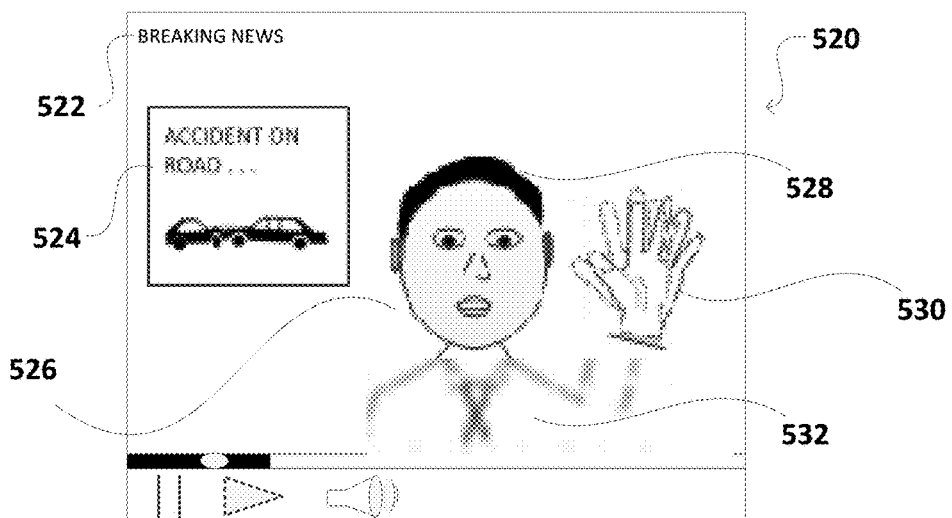
Figure 5C:
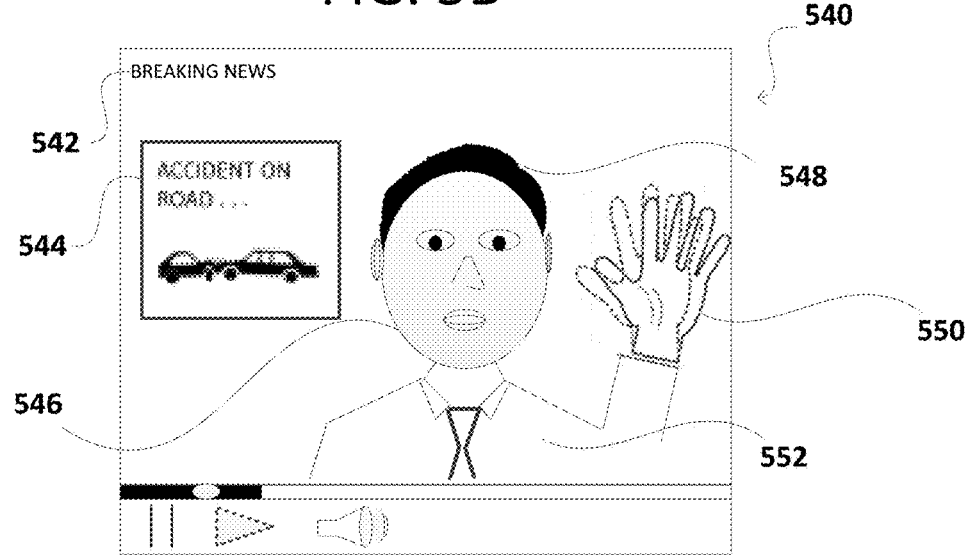

FIGS. 5A-C illustrate example streaming videos 500-540 with different effects from applied confidence-based encoding in accordance with various embodiments. In the streaming video 500 of FIG. 5A, the entire person 506 is classified as an ROI (including head 508, gesturing hand 510, and torso region 512). In contrast, the background 504 and the background text 502 are classified as unimportant regions of the media stream. In an example, the classifier discussed throughout this disclosure marks areas that remain unclassified as unimportant regions. Accordingly, an unclassified region may be referred to as classified as an unimportant region for simplicity of the discussion. A person of ordinary skill, upon reading the present disclosure would recognize the classification differences attained using the present confidence-based encoding techniques.

In streaming video 520 of FIG. 5B, only the head 528 and gesturing hand 530 are classified as ROIs. The torso region 532 remains unclassified and is treated as unimportant part of the streaming video 520. As a result, parts of the entire person 526 are treated as ROI and non-ROI portions. Additional bits are allocated to the head 528 and gesturing hand 530 regions making them clearer than the blurry torso 532. In addition, the present confidence-based encoding also provides different levels of bit allocations for different ROIs based on their associated confidence measures. For example, the background 524 and background text 522 may have additional bits allocated than the torso 532, but may be lesser bits than the head 528 and the gesturing hand 530.

Further, the bit allocation also takes into account the number of bits required to provide the complete component in the scene. For example, the background 524 may not require as many bits as head 528 in the first place, but also, the background 524 may still be allocated lesser bits than optimally required. As a result, the discussion of bit allocation may be based on a reference—e.g., optimal bits allocated to achieve a certain pixel density or a certain resolution. Furthermore, the restrictions in the bandwidth and/or the restrictions of the receiving client device may be taken into account to determine optimal bits available and to then allocate bits to ROI and non-ROI regions from the optimal bits available. In an implementation, the background 504 and the background text 502 are classified as semi-important regions of the media stream or streaming video 520. Bit allocation based on optimal bits available is then used to stagger the bit rate in the confidence-based encoding process.

In streaming video 540 of FIG. 5C, the entire person region 546 is classified as ROI with most of the optimal bits available provided to this region. In contrast, the background 544 and background text 542 may have fewer bits allocated than the person region 546. In an alternative implementation, depending on the confidence measure of the present confidence-based encoding, the entire optimal bits available for a streaming video may be adjusted to be lower than threshold. In such an implementation, the general video stream provides a perception of an expected quality that is not the highest resolution, but when more bits are allocated to specific regions—within the lower adjusted optimal bits available—the perception is that the video quality may be better. This provides savings for bandwidth adjustments required during high traffic times, while balancing latency issues.

Figure 6:
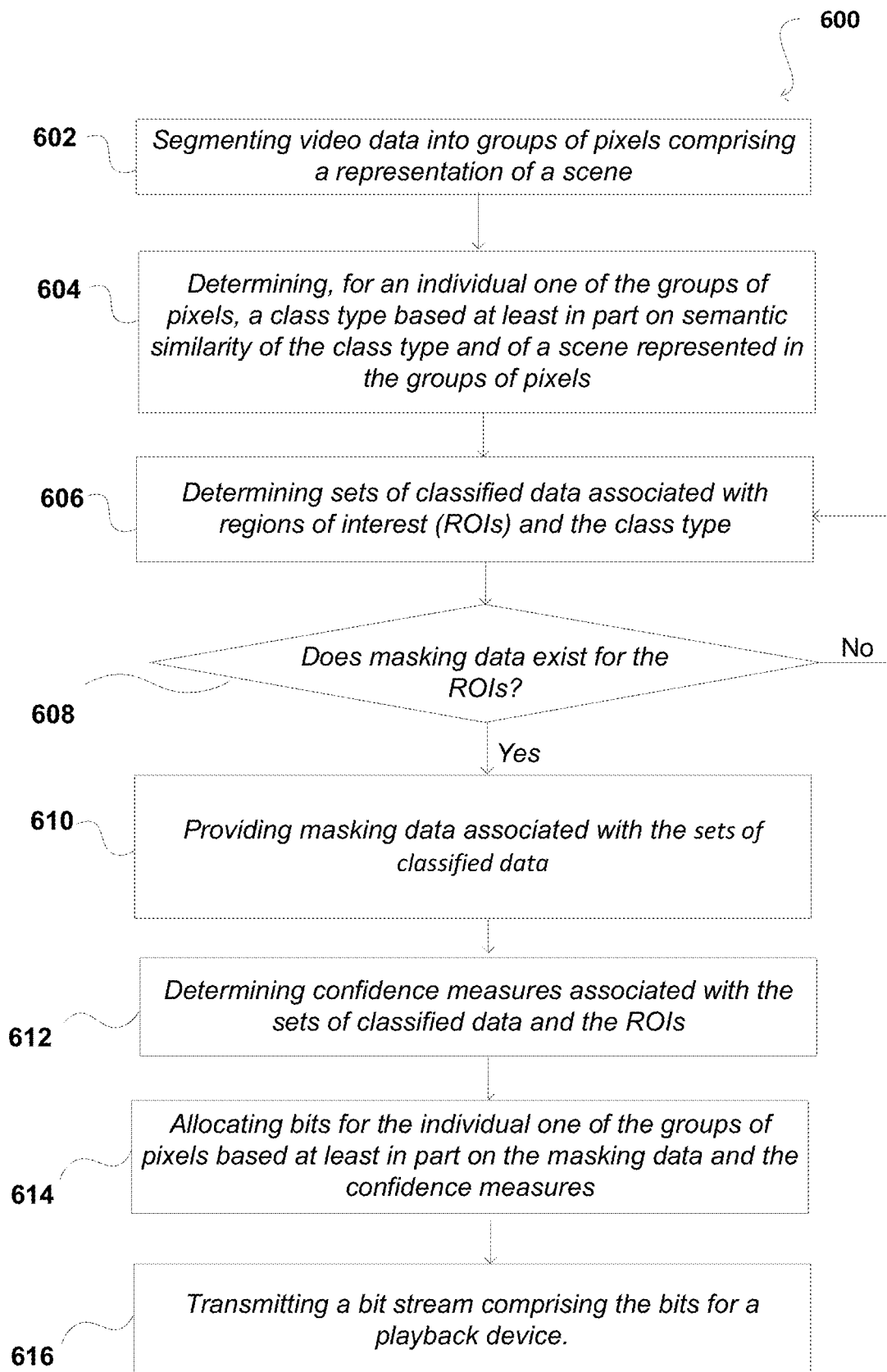
FIG. 6 illustrates an example flowchart implementing the confidence-based encoding in an aspect of the disclosed embodiments.

FIG. 6 illustrates an example flowchart 600 implementing the confidence-based encoding in an aspect of the disclosed embodiments. It should be understood that, for any process discussed herein, there can be additional, fewer, or alternative steps performed in similar or alternative orders, or in parallel, within the scope of the various embodiments. Sub-process 602 provides segmenting of a video into groups of pixels. In an aspect of this disclosure, the segmenting may provide frames, macroblocks, or groups of bits. Sub-process 604 determines a class type for an individual one of the groups of pixels. The class types is based at least in part on semantic similarity of the class type and of a scene represented in the groups of pixels, as described with respect to FIGS. 2 and 3A-C. In an example, the sub-process 604 may be configured to extract features that are semantically representative of the scene from the group of pixels. The sub-process 604 may also be configured to perform classification of the features in at least a two-dimensional feature-based classification algorithm to determine the class type in which the features fit. Features outside the fit may be used as a basis to provide a first confidence measure for the determined class type.

Sub-process 606 determines sets of classified data associated with regions of interest (ROIs). A further feature in sub-process 606 may perform a classification for data associated with a unique scene component from multiple scenes in the video or video stream. Such a classification may be performed by a multi-dimensional data classification algorithm. Sub-process 608 determines that masking data exist for the ROIs. As described with reference to FIG. 3C, the ROI extractor toolbox 344 may be one implementation of a data structure storing the masking data and providing it sub-process 608 to make the determination. When the determination is made that no masking data exists, sub-process 606 may be initiated to determine other classified data associated with ROIs. For example, if the head is suddenly not an ROI, and the gesturing hand is continuously changing gestures, then viewers may focus on the hand, and the confidence-based encoding herein recognizes the gesturing hand as a new or prominent ROI than the head.

When the determination is made that masking data exists, sub-process 612 determines confidence measures associated with the sets of classified data and the ROIs. As described with respect to FIGS. 2 and 3A-C, such confidence measures may be based at least in part on the fit between the scene components of a scene and the classified data from the ROI extractor toolbox 344. For example, the first confidence measure may be applied as a confidence measure for the sub-process 612. In addition, the determining of the sets of classified data may provide a second confidence measure that is associated with a fit of the classified data and the masking data associated with the ROIs.

Further to the above sub-process 606, for determining classified data associated with the ROIs, an additional sub-process may be configured to perform a classification for scene types associated with a multiple scenes using a multi-dimensional data classification algorithm to generate class types. The class types may be stored with the semantic class types 342 referenced in FIG. 3C. In yet another aspect, such an additional sub-process may be configured to perform a classification of unique scene components from individual ones of the multiple scene types. The unique scene components include component data that classifies uniquely for at least two scene features.

Sub-process 614 allocates bits for the individual one of the groups of pixels based at least in part on the masking data and the confidence measures. Sub-process 616 then transmits a bit stream comprising the bits for a playback device. In an example implementation, a further sub-process may be applied to repeat steps 604-614 to obtain additional bit streams by processing additional groups of pixels similar to the individual one of the groups of pixels processed started in sub-process 604.

Figure 7:
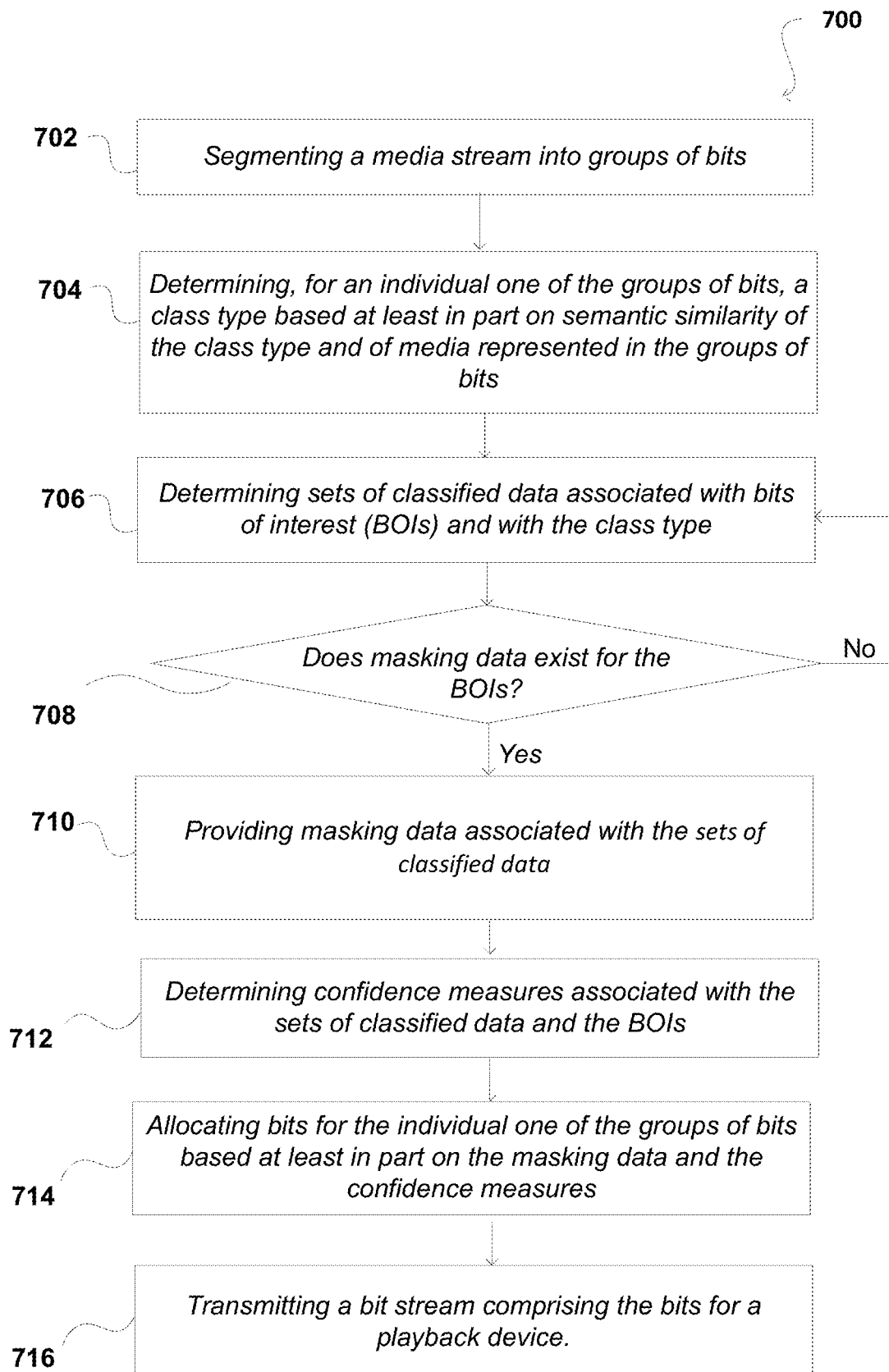
FIG. 7 illustrates an alternate example flowchart implementing the confidence-based encoding in an aspect of the disclosed embodiments.

FIG. 7 illustrates another example flowchart 700 implementing the confidence-based encoding in an aspect of the disclosed embodiments. Sub-process 702 provides segmenting of a media stream into groups of bits. In an aspect of this disclosure, the segmenting may provide frames, macroblocks, or groups of bits. Sub-process 704 determines a class type for an individual one of the groups of bits. The class types is based at least in part on semantic similarity of the class type and of a scene represented in the groups of bits, as described with respect to FIGS. 2 and 3A-C. In an example, the sub-process 704 may be configured to extract features that are semantically representative of media from the group of bits. The sub-process 704 may also be configured to perform classification of the features in at least a two-dimensional feature-based classification algorithm to determine the class type in which the features fit. Features outside the fit may be used as a basis to provide a first confidence measure for the determined class type.

Sub-process 706 determines sets of classified data associated with bits of interest (BOIs). A further feature in sub-process 706 may perform a classification for data associated with a unique media component from multiple media areas in the media stream. Such a classification may be performed by a multi-dimensional data classification algorithm. Sub-process 708 determines that masking data exist for the BOIs. The ROI extractor toolbox of FIG. 3C may be replicated to perform functions for the BOIs using masking data of bits of the media stream instead of masking data of scene components of the video. As such, a BOI extractor toolbox, in one implementation, is a data structure storing the masking data and providing it sub-process 708 to make the determination of whether masking data exist for the BOI. When the determination is made that no masking data exists, sub-process 706 may be initiated to determine other classified data associated with BOIs. For example, if a portion of the media stream is suddenly not a portion with BOIs, and another portion is continuously changing, then the continuously changing portion may be of higher importance and may demand more focus. The confidence-based encoding herein recognizes the changing portion as a new or prominent BOI and makes its bit allocations accordingly.

When the determination is made that masking data exists, sub-process 712 determines confidence measures associated with the sets of classified data and the BOIs. As described with respect to FIGS. 2 and 3A-C, such confidence measures may be based at least in part on the fit between the bits of a media stream and the classified data from a BOI extractor toolbox as described above. For example, the first confidence measure may be applied as a confidence measure for the sub-process 712. In addition, the determining of the sets of classified data may provide a second confidence measure that is associated with a fit of the classified data and the masking data associated with the BOIs.

Further to the above sub-process 706, for determining classified data associated with the ROIs, an additional sub-process may be configured to perform a classification for bits associated with bits of the media stream using a multi-dimensional data classification algorithm to generate class types. The class types may be stored in a data structure analogous to the semantic class types 342 referenced in FIG. 3C. In yet another aspect, such an additional sub-process may be configured to perform a classification of unique bit areas from individual ones of the multiple bit areas in the media stream. The unique bit areas include component data that classifies uniquely for at least two media features—e.g., pitch and frequency, for instance, when the media stream is an audio stream.

Sub-process 714 allocates bits for the individual one of the groups of pixels based at least in part on the masking data and the confidence measures. Sub-process 716 then transmits a bit stream comprising the bits for a playback device. In an example implementation, a further sub-process may be applied to repeat steps 704-714 to obtain additional bit streams by processing additional groups of bits similar to the individual one of the groups of bits processed started in sub-process 704.

Figure 8:
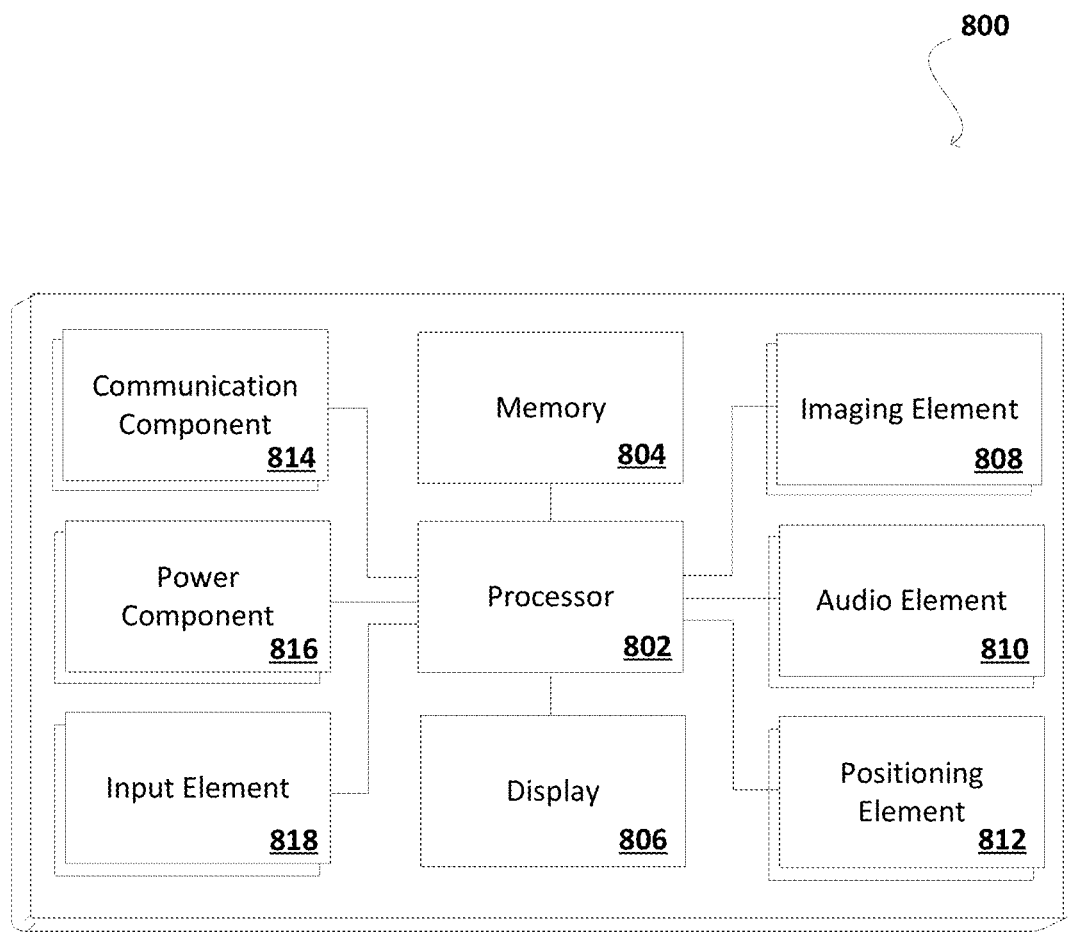
FIG. 8 illustrates a logical arrangement of a set of components of an example computing device that can be used to implement aspects of the various embodiments.

FIG. 8 illustrates a logical arrangement of a set of components 802-818 of an example computing device 800 that can be used to implement aspects of the various embodiments. In this example, the computing device or client device 800 includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers.

As discussed, the computing device or client device 800 in many embodiments will include at least one input element 818 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. As such, the audio element 810 and imaging element 808 may provide features to support such audio and visual control of the computing device 800. In embodiments, the computing device 800 of FIG. 8 can include one or more network interface elements as part of communication component 814 for communicating over various networks, such as a Wi-Fi, Bluetooth, RF, wired, or wireless communication systems. The device in many embodiments can communicate with a network, such as the Internet, and may be able to communicate with other such devices. In addition, power component 816 provides remote or wired power to the computing device 800 and its various components 802-814 and 818. Positioning element 812 is able to provide static and dynamic position information for use with the present encoder. In an example, the positioning element 812 provides inputs of the orientation of the display and, as a result, the streaming video or media may be provided in a different playback configuration (e.g., portrait or landscape or different screen area than originally displayed). In addition, positioning element 812 provides coordinate inputs that may be communicated via communication component 814 to enable a remote server to select the best server and bandwidth to enhance playback of media.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python®, or Tool Command Language (TCL), as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system comprising:
   at least one processor; and
   a memory device including instructions that, when executed by the at least one processor, cause the system to:
   receive video data for adaptive compression;
   segment the video data into video segments;

determine, for an individual one of the video segments, a class type based at least in part on semantic similarity between the class type and a scene represented in the video segments;

determine a first confidence measure associated with the semantic similarity;

determine sets of classified data associated with regions of interest (ROIs) in the video data based at least in part on the class type and the first confidence measure;

provide masking data associated with the sets of classified data based at least in part on the ROIs;

determine second confidence measures associated with the sets of classified data and the ROIs;

allocate bits for the individual one of the video segments based at least in part on the masking data and the second confidence measures, wherein the masking data indicates an amount of bits to allocate to one or more of the ROIs versus other parts of the video data;

generate a bit stream from the bits; and provide the bit stream for display to a display device.

2. The system of claim 1, wherein the instructions, when executed by the at least one processor, further cause the system to:

receive the bit stream;

decode the bit stream based at least in part on the allocated bits; and provide the bit stream for the display device.

3. The system of claim 1, wherein the instructions, when executed by the at least one processor, further cause the system to:

use a compression algorithm to compress the bit stream to reduce the allocated bits for the individual one of the video segments.

4. The system of claim 1, wherein the instructions, when executed by the at least one processor, further cause the system to:

determine, for additional video segments than the individual one of the video segments, that the semantic similarity is less than threshold for scenes represented in the additional video segments; and allocate non-ROI bits for the additional video segments, the non-ROI bits being fewer than the allocated bits for the individual one of the video segments.

5. The system of claim 1, wherein the instructions, when executed by the at least one processor, further cause the system to:

generate the bit stream to comprise additional bit streams obtained by processing additional video segments of the video data to provide a mixed bit stream.

6. The system of claim 5, wherein the instructions, when executed by the at least one processor, further cause the system to:

obtain individual ones of the additional bit streams by processing the additional video segments similar to the individual one of the video segments.

7. The system of claim 1, wherein the instructions, when executed by the at least one processor, further cause the system to:

classify data associated with a unique scene component of the scene using a multi-dimensional data classification algorithm; and use the sets of classified data to determine the class type with the first confidence measure.

8. A computer-implemented method, comprising:

segmenting video data into groups of pixels comprising a representation of a scene;

determining, for an individual one of the groups of pixels, a class type based at least in part on semantic similarity of the class type and of at least a portion of the scene represented in the groups of pixels;

determining sets of classified data associated with regions of interest (ROIs) and with the class type;

providing masking data associated with the sets of classified data;

determining confidence measures associated with the sets of classified data and the ROIs;

allocating bits for the individual one of the groups of pixels based at least in part on the masking data and the confidence measures, wherein the masking data indicates an amount of bits to allocate to one or more of the ROIs versus other parts of the video data; and providing a bit stream comprising the bits for a playback device.

9. The computer-implemented method of claim 8, further comprising:

performing a classification for data associated with a unique scene component from a plurality of scenes using a multi-dimensional data classification algorithm to generate the classified data.

10. The computer-implemented method of claim 8, further comprising:

performing a classification for scene types associated with a plurality of scenes using a multi-dimensional data classification algorithm to generate class types.

11. The computer-implemented method of claim 10, wherein the performing of a classification for scene types further comprises:

performing a classification of unique scene components from individual ones of the plurality of scene types, the unique scene components comprising component data that classifies uniquely for at least two scene features.

12. The computer-implemented method of claim 8, wherein the determining of a class type further comprises:

extracting features that are semantically representative of the scene from the group of pixels; and performing classification of the features in at least a two-dimensional feature-based classification algorithm to determine the class type in which the features fit.

13. The system of claim 1, where the instructions, when executed by the at least one processor, further cause the system to:

compress the bit stream using a compression algorithm that reduces the allocated bits for the individual one of the groups of pixels.

14. The system of claim 1, where the instructions, when executed by the at least one processor, further cause the system to:

determine, for additional groups of pixels than the individual one of the groups of pixels, that the semantic similarity is less than a threshold for scenes represented in the additional groups of pixels; and allocate non-ROI bits for the additional groups of pixels, the non-ROI bits being fewer than the allocated bits for the individual one of the groups of pixels.

15. The system of claim 1, where the instructions, when executed by the at least one processor, further cause the system to:

generate the bit stream to comprise additional bit streams obtained by processing additional groups of pixels of the video data to provide a mixed bit stream.

16. The system of claim 5, where the instructions, when executed by the at least one processor, further cause the system to:

obtain individual ones of the additional bit streams by processing the additional groups of pixels in a similar manner as the individual one of the groups of pixels.

17. The system of claim 1, where the instructions, when executed by the at least one processor, further cause the system to:

perform classifications for data associated with the scene to determine unique scene components, the classifications using multi-dimensional data classification algorithms; and determine the masking data by matching the unique scene components with the ROIs from an ROI database.

18. A non-transitory computer-readable medium comprising instructions that, when executed by at least one processor of a system, cause the system to:

segment video data into groups of pixels comprising a representation of a scene;

determine, for an individual one of the groups of pixels, a class type based at least in part on semantic similarity of the class type and of a scene represented in the groups of pixels;

determine sets of classified data associated with regions of interest (ROIs) and with the class type;

provide masking data associated with the sets of classified data;

determine confidence measures associated with the sets of classified data and the ROIs;

allocate bits for the individual one of the groups of pixels based at least in part on the masking data and the confidence measures, wherein the masking data indicates an amount of bits to allocate to one or more of the ROIs versus other parts of the video data; and generate a bit stream comprising the bits for a playback device.

19. The non-transitory computer-readable medium of claim 18, wherein the instructions, when executed by the at least one processor of the system, further cause the system to:

perform a classification for data associated with a unique scene component from a plurality of scenes using a multi-dimensional data classification algorithm to generate the classified data.

20. The non-transitory computer-readable medium of claim 18, wherein the instructions, when executed by the at least one processor of the system, further cause the system to:

perform a classification for scene types associated with a plurality of scenes using a multi-dimensional data classification algorithm to generate class types.

* * * * *